(12) United States Patent
Maclean

(10) Patent No.: US 7,785,469 B2
(45) Date of Patent: Aug. 31, 2010

(54) WASTE WATER TREATMENT PROCESS SYSTEM

(75) Inventor: Gregory W. Maclean, Caringbah (AU)

(73) Assignee: Nubian Water Systems Pty Ltd, Artarmon NSW (AU)

( * ) Notice: Subject to any disclaimer, the term of this patent is extended or adjusted under 35 U.S.C. 154(b) by 11 days.

(21) Appl. No.: 11/719,778

(22) PCT Filed: Nov. 22, 2005

(86) PCT No.: PCT/AU2005/001774
§ 371 (c)(1),
(2), (4) Date: Sep. 25, 2007

(87) PCT Pub. No.: WO2006/053402
PCT Pub. Date: May 26, 2006

(65) Prior Publication Data
US 2008/0173581 A1 Jul. 24, 2008

(30) Foreign Application Priority Data
Nov. 22, 2004 (AU) .............................. 2004906658

(51) Int. Cl.
*C02F 3/06* (2006.01)

(52) U.S. Cl. ................... 210/617; 210/618; 210/150
(58) Field of Classification Search ................ 210/616, 210/617, 618, 150, 151
See application file for complete search history.

(56) References Cited

U.S. PATENT DOCUMENTS

| | | | | |
|---|---|---|---|---|
| 3,956,128 A | * | 5/1976 | Turner | 210/150 |
| 4,322,296 A | * | 3/1982 | Fan et al. | 210/618 |
| 4,545,909 A | * | 10/1985 | Atkinson et al. | 210/618 |
| 4,568,458 A | * | 2/1986 | Maclean | 210/197 |
| 4,869,815 A | * | 9/1989 | Bernard et al. | 210/151 |
| 4,921,604 A | * | 5/1990 | Moellenbeck | 210/151 |
| 5,019,268 A | * | 5/1991 | Rogalla | 210/617 |
| 5,041,216 A | | 8/1991 | Henzler et al. | |
| 5,458,779 A | | 10/1995 | Odegaard | |

(Continued)

FOREIGN PATENT DOCUMENTS

CA 2409585 4/2004

(Continued)

OTHER PUBLICATIONS

International Preliminary Report on Patentability—Australian Patent Office.

*Primary Examiner*—Christopher Upton
(74) *Attorney, Agent, or Firm*—Ladas & Parry LLP

(57) ABSTRACT

An aerated biological filtration system (10) for treating waste water includes a treatment vessel (11) of elongated configuration which incorporates a circulating filter bed (23) and a static filter bed (24). The circulating filter bed incorporates a particulate material such as granulated activated carbon having a specific gravity in the range of 1.2 to 1.4 and effective size of 0.6 mm to 1.5 mm. The circulating filter bed is disposed above the static filter bed and an aeration system (27) is disposed between the filter beds. The aeration system is arranged to diffuse air through the circulating bed either continuously or intermittently so as to provide oxygen to micro-organisms attaching to the particulate material and to cause slow circulation of that particulate material. The system has particular application for domestic recycling of grey water.

21 Claims, 2 Drawing Sheets

U.S. PATENT DOCUMENTS

| | | | |
|---|---|---|---|
| 5,618,413 A * | 4/1997 | Todd et al. | 210/151 |
| 5,705,057 A * | 1/1998 | Hoffa | 210/150 |
| 5,895,576 A * | 4/1999 | Yamasaki et al. | 210/151 |
| 5,985,149 A * | 11/1999 | Raetz et al. | 210/617 |
| 6,077,424 A | 6/2000 | Katsukura et al. | |
| 6,159,372 A | 12/2000 | Yang | |
| 6,444,126 B1 * | 9/2002 | Gates et al. | 210/150 |
| 2006/0186041 A1 * | 8/2006 | Dempsey | 210/617 |

FOREIGN PATENT DOCUMENTS

| | | |
|---|---|---|
| JP | 57-102289 | 6/1982 |
| JP | 57-122997 | 7/1982 |
| JP | 03-178395 | 8/1991 |
| JP | 08-103781 | 4/1996 |
| JP | 09-174082 | 7/1997 |
| JP | 10-076288 | 3/1998 |
| JP | 2000-288568 | 10/2000 |
| JP | 2001-104973 | 4/2001 |
| JP | 2001-239291 | 9/2001 |
| JP | 2002-011497 | 1/2002 |
| JP | 2002-066586 | 3/2002 |
| JP | 2002-079283 | 3/2002 |
| JP | 2002-219477 | 8/2002 |
| JP | 2003-154385 | 5/2003 |
| KR | 2002-011359 | 2/2002 |
| KR | 2004-085541 | 10/2004 |
| WO | WO2006/053402 | 5/2006 |

* cited by examiner

WASTE WATER TREATMENT PROCESS SYSTEM

FIELD OF THE INVENTION

The present invention relates to a method and system for treating waste water, in particular residential grey water domestic waste.

BACKGROUND OF THE INVENTION

Filtration systems for treatment of polluted water include submerged aerated biological filters (SABF) which comprise a submerged bed of an inert particulate material on which micro-organisms which are responsible for treatment of contaminants within the water are attached. Waste water is passed through the fixed bed and the micro-organisms adsorb soluble or particulate pollution and subsequently aerobically degrade this material producing carbon dioxide, water, and additional cellular mass. Air is passed through the bed to provide oxygen to the micro-organisms.

Conventional particulate types for the bed include expanded clays and, in systems with floating media, polystyrene. Typically relatively coarse granular material, having an effective size of about 3 mm is used in systems having "deep beds", typically beds having a depth greater than about 2.5 m. Waste water may flow either in a counter current to an air supply (down-flow) or co-current to an air supply (up-flow).

In addition to providing attachment sites for micro-organisms, the filter bed typically act as a mechanical filter, trapping suspended solids present in the waste water and trapping biomass debris. Over time, the filter bed becomes blocked or clogged by the growth of micro-organisms and suspended non-degradable solids, which cause a resistance to flow of water through the particulate material, resulting in an increase in hydraulic pressure required to drive the system. To remove excess cellular mass and solids captured within the filter bed, the bed is backwashed by introducing water to flush the solids from the beds The rate at which solids build up and pressure drop across the filter occurs determines the frequency with which the system requires to be backwashed, and backwash frequency is an important parameter in determining the overall efficiency of a filtration system.

Any discussion of documents, publications, acts, devices, substances, articles, materials or the like which is included in the present specification has been done so for the sole purpose so as to provide a contextual basis for the present invention. Any such discussions are not to be understood as admission of subject matter which forms the prior art base portion, or any part of the common general knowledge of the relevant technical field in relation to the technical field of the present invention to which it extended at the priority date or dates of the present invention.

SUMMARY OF THE INVENTION

In a first aspect, the present invention provides an aerated biological filtration system for treating waste water, the system comprising: a treatment vessel through which waste water to be treated will pass, the treatment vessel having an inlet and an outlet; a circulating filter bed located in the treatment vessel between the inlet and the outlet, the circulating filter bed being comprised of a particulate filter material, individual particles having a surface or pore structure selected or adapted to facilitate the attachment of micro-organisms on the particles, and aeration means adapted to diffuse air through the filter bed either continuously or intermittently whilst waste water is being treated in the filter bed; wherein the structure and the operating characteristics of the treatment vessel, the circulating filter bed and the aeration means are selected such that the particles are able to move relative to each other within the circulating filter bed; and operation of the filtration system will cause a substantial portion of the particulate material to circulate within the circulating filter bed over time.

In the context of the specification, the term "circulate" and its grammatical derivations are used in a general sense to indicate substantial movement of the particles within the filter bed, and those terms are not used in a more limited sense to require the individual particles to move in a complete circuit back to a particular starting point.

The provision of a circulating filter bed permits higher level of solids to be stored in the bed as compared to a static bed before backwashing is necessary, and slows head loss developing across the surface of the bed where the concentration of pollutants would otherwise be high. In some embodiments of the waste water treatment process, particularly when used in domestic applications, backwash volumes of around 1% of treated water volumes can be. demonstrated and volumes of less than about 5% are anticipated overall.

The particulate material used in the circulating filter bed is typically selected from the group comprising a granular carbon material, an expanded heat treated clay material, a granulated blast furnace slag, or the like.

In a particular embodiment, the particulate filter material is granular activated carbon (GAC), which is a coal derived carbon with an effective size of in the range of 0.6 mm to 1.5 mm, preferably about 0.7 mm and 1.0 mm. The effective size of the material is the size of an aperture through which 10% of the particles by weight may pass. The bulk density of such a suitable GAC is typically in the range of about 400 to 550 $kg/m^3$, more preferably in the range of from 430 to 480 $kg/m^3$. The specific gravity of such a suitable GAC can be in the range of from about 1.2 to 1.4. and the uniformity coefficient is less than about 2 and more preferably less than about 1.6.

Such a particulate material for the filter bed can provide an effective mechanism for the physical adsorption of pollutants, allowing the system to handle a wide range of pollutant concentration in the influent without significant impact on the effluent quality. Further, the size and specific gravity of the material used are such that the air volumes necessary to ensure an appropriate level of circulation of the filtration bed material are consistent with the air requirements of the biological process occurring within the system. With this arrangement, the aeration means can be used to cause circulation of the filter bed. Further, as the adsorbed pollutants can be subsequently digested by the micro-organisms which form upon the particles of the particulate filter material, the aeration system may be sized to meet average, rather than peak load conditions, and may eliminate the need for expensive aeration control systems.

In a second aspect, the present invention provides an aerated biological filtration system for treating waste water, the system comprising: a treatment vessel through which waste water to be treated will pass, the treatment vessel having an inlet and an outlet; a filter bed located in the treatment vessel between the inlet and the outlet, the filter bed comprising a particulate filter material, the particles of the particulate filter material having a specific gravity in the range of 1.2 to 1.4 and an effective size of 0.6 mm to 1.5 mm; and aeration means adapted to diffuse air through the filter bed either continuously or intermittently whilst waste water is being treated in said filter bed.

The particulate material used is preferably a granular activated carbon material. The effective size of the particulate filter material is preferably in the range from 0.7 to 1.0 mm.

In one form, the system is adapted for the treatment of grey water from a domestic dwelling and is sized so as to be positioned beneath the eaves of a residential dwelling. In a particular embodiment the height of the filter bed is less than about 2.5 meters, more preferably less than about 2.0 meters and still more preferably less than about 1.5 meters.

In a particular form, the treatment vessel is of generally elongate configuration, and is mounted with its axis generally vertical, the inlet being located above the circulating filter bed, and the outlet located below the circulating filter bed. The vessel may have a height to average diameter ratio of between 0.5:1 and 8:1 and preferably between about 4:1 and 6:1.

The treatment vessel may include a head zone positioned above the filter bed. The head zone is arranged to contain a head of influent which provide a head pressure across the bed. The head zone may be separated from the filter bed by a media capturing means preferably in the form of a mesh.

In one form, a static filter bed is located downstream of the circulating filter bed. In a particular form, the static filter bed is located below the circulating filter bed, the static filter bed being comprised of particulate material having a dry specific gravity of greater than 1. The static filter bed is preferably formed from a sand or similar particulate material.

In one form, the aeration means is located below the filter bed. In a particular form, the aeration means is located at or above the interface between the circulating filter bed and the static filter bed.

In a further aspect, the invention provides an aerated biological filtration system for treating waste water, the system comprising: a treatment vessel through which waste water to be treated will pass, the treatment vessel having an inlet and an outlet; a circulating filter bed located in the treatment vessel between the inlet and the outlet; a static filter bed located in the treatment vessel downstream of the circulating filter bed, the static filter bed comprising a particulate material having a specific gravity of greater than 1; and aeration means adapted to diffuse air through the circulating filter bed either continuously or intermittently whilst waste water is being treated in the circulating filter bed.

A diffuser may be located below the interface between the circulating filter bed and the static filter bed, the diffuser providing air so as to effect scouring of the circulating filter bed and the static filter bed to assist is cleaning of the filtration system during backwashing.

A holding tank may be located upstream of the inlet of the treatment vessel for containment and/or buffering of waste water prior to treatment. A storage vessel may be located downstream of the outlet of the treatment vessel to contain treated water therein.

In a further aspect, the present invention provides a method for treating waste water, the method comprising the steps of: providing an aerated biological filtration system, the aerated biological filter comprising a treatment vessel having an inlet and an outlet; a filter bed located in the treatment vessel, the filter bed being comprised of a particulate material, individual particles having a surface or pore structure selected or adapted to facilitate attachment of micro-organisms on the particles, and aeration means; passing waste water through the treatment vessel via the inlet and the outlet; diffusing air from the aeration means through the filter bed; and circulating the filter bed such that the particulate material particles move relative to each other in the filter bed, and such that a substantial portion of the particulate material circulates within the filter bed over time.

Preferably the manner in which the aeration means diffusing air through the filter bed is controlled so as to effect circulation of the filter bed.

In a fifth aspect, the present invention provides a method of treating waste water, the method comprising the steps of: providing an aerated biological filtration system having a filter bed comprising particulate filter material having micro-organisms attached thereto; passing waste water through filter bed; and diffusing air through the filter bed so as to provide oxygen to the micro-organisms attached to the surface of the particles and to cause circulation of the particles in the filter bed.

BRIEF DESCRIPTION OF THE DRAWINGS

It is convenient to hereinafter describe embodiments of the present invention with reference to the accompanying drawings. It is to be appreciated however that the particularity of the drawings and the related description is to be understood as not limiting the preceding broad description of the invention. In the drawings.

DETAILED DESCRIPTION OF EMBODIMENTS OF THE INVENTION

Figure 1:
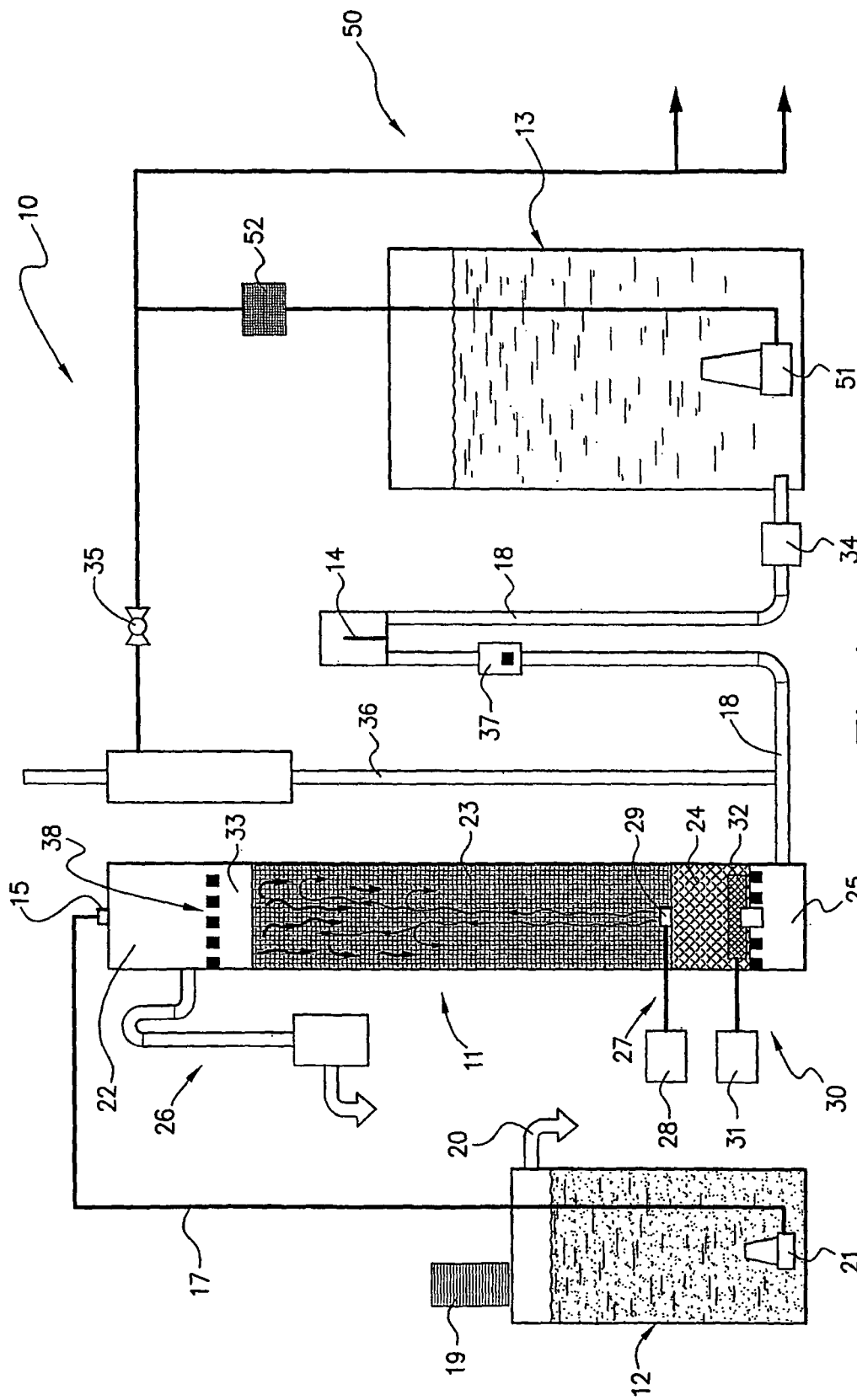
FIG. 1 shows a schematic representation of a waste water treatment system according to an embodiment of the present invention.

In describing the preferred embodiment of the waste water treatment system illustrated in the drawings, for the sake of clarity reference will be made to the operation of the waste water treatment system when applied to recycling of grey water waste from a domestic residence. However, the waste water treatment process is not intended to be limited to treating grey water.

Grey water can be classified as waste water generated from clothes washing, kitchen usage and showers, as distinguished from "black water" or more highly polluted water from toilets. Such waste water may be characterised by relatively low pollution loadings, low faecal contamination and thereby treatable by biological means.

Referring to FIG. 1, there is shown a schematic representation of a waste water treatment system 10 for treatment of grey water generated by a domestic dwelling. The system 10 includes a treatment vessel 11, a waste water storage tank 12 in fluid communication with the treatment vessel 11 via feed line 17, and a treated water tank 13 in fluid communication with the treatment vessel 11 via a discharge line 18 with a flow control weir 14 disposed therebetween. The treatment vessel has an inlet port 15 for receiving grey water from the waste water storage tank 12, the inlet port 15 being located at an upper portion of the treatment vessel 11 and an outlet port 16 for discharge of treated water to the treated water tank 13 and being located at a lower portion of the treatment vessel 11.

The waste water storage tank 12 includes an inlet screen 19. Raw untreated grey water is pumped or gravitated over the screen 19 into tank 12. The inlet screen 19 may be a self-cleaning screen which is suitable for the removal of lint and hair for example, when the origin of the grey water is from a washing machine or shower waste. The waste water tank 12 provides short-term storage of grey water, and may also provide buffering of the waste water prior to being delivered to the treatment vessel 11. In the event that inflow of waste water exceeds the capacity of storage tank 12 or the treated water tank 13 is full, the waste water entering the waste water storage tank 12 may be directed to overflow to sewer by an overflow port 20. A treatment vessel feed pump 21 is disposed in the waste water storage tank 12 and delivers raw untreated water at a predetermined rate from the waste water storage tank 12 to the treatment vessel 11 via inlet port 15.

The treatment vessel 11 is formed as an elongate cylindrical structure which is generally cylindrical with its axis vertical. The vessel of the illustrated form is 2.4 m high having a diameter of approximately 250 mm. It is to be appreciated that the size of the vessel may vary depending on the application of the system 10.

The vessel 11 includes four primary sections; a head zone 22, a circulating filter bed 23 disposed below the head zone 22, a static filter bed 24 located below and supporting the circulating filter bed 23, and a plenum chamber 25. Each of these zones are in fluid communication and the inlet port 15 is connected to the head zone 22 and the outlet port 16 is connected to the plenum chamber 25.

The treatment vessel 11 further comprises a self priming siphon 26 which is able to discharge water from the head zone 22 to the sewer. An aeration system 27 is also provided which comprises an aeration pump 28 and a diffuser outlet 29. The diffuser outlet 29 is disposed between the circulating filter bed 23 and the static filter bed 24 and is adapted to aerate the circulating filter bed either intermittently or continuously whilst waste water is being treated in the circulating filter bed 23. The purpose of the aeration system 27 is to provide oxygen to the circulating filter bed and also to provide a motive force to cause circulation of the filter bed 23 as will be discussed in more detail below.

Finally, the treatment vessel 10 further comprises an air scourer distribution system 30 which is disposed at the bottom of the static filter bed 24. The air scourer distribution system comprises an air pump 31 and a diffuser head 32.

The circulating filter bed 23 comprises particulate filter material, being suitably sized individual particles having surfaces for the attachment of micro-organisms so as to form a biofilm upon the particles. Air is diffused into the bottom of the filter bed 23 by the aeration systems 27 and percolates up through the particulate material 23 in counter current flow to the down-flow of the water stream being treated. In other embodiments and/or applications, upward co-current flow of air and waste water may be used. The air supports the metabolism of micro-organisms which attach to the individual particles of the filter bed 23 surface, and which undertake the adsorption and digestion of pollutants in the waste water. The filter bed 23 also acts also as a filter medium to filter out and trap suspended solids and generated biomass debris and physically adsorbs high concentrations of pollutants as described above.

In the embodiment shown in FIG. 1, the particulate filter material used is granulated. In a preferred embodiment, the particular filter material is granular activated carbon (GAC), which is a coal derived carbon with an effective size of in the range of 0.6 mm to 1.5 mm, preferably about 0.7 mm and 1.0 mm. The bulk density of such a suitable GAC can be in the range of about 400 to 550 kg/m$^3$, more preferably in the range of from 430 to 480 kg/m$^3$. The specific gravity of such a suitable GAC can be in the range of from about 1.2 to 1.4. Preferably the uniformity coefficient is less than about 2 and more preferably less than about 1.6. Such a media can provide an effective mechanism for the physical adsorption of pollutants, allowing the system to handle a wide range of pollutant concentration in the influent without significant impact on the effluent quality. In other embodiments the particulate filter material may be expanded clays, provided the required biological and physical filtration characteristics are provided by such material. The effective size of the particles is the size of an aperture through which 10% of the media by weight may pass. The size and specific gravity of the particles used are selected such that the air volumes provided by the aeration system 27 required for the biological processes occurring with the filter bed 23 also provide an appropriate level of circulation of the filter bed.

In the illustrated form, the depth of the circulating filter bed 23 is in the order of 1.5 m whereas the depth of the static filter bed 24 is in the order of 300 mm. Again the size of these beds may vary depending on the specific application of the treatment system 10 as will be appreciated by those skilled in the art.

The manner in which the air diffuses from the aeration system 27 is configured so as to effect slow circulation of the filter bed 23 within the treatment vessel 11. The slow circulation of the filter bed 23 is discussed below in more detail below with reference to FIG. 2.

Figure 2:
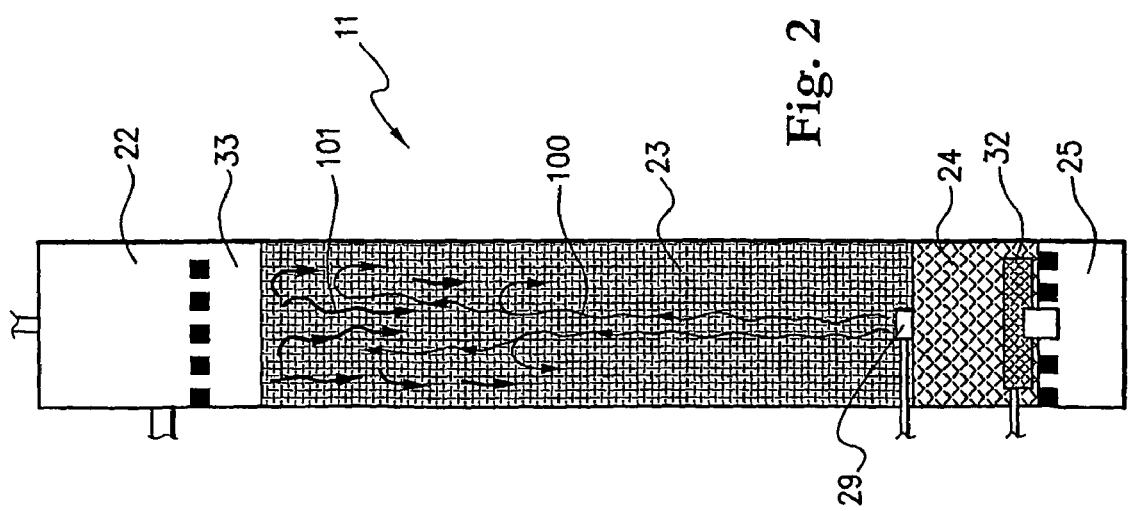
FIG. 2 schematically depicts the circulating bed of the treatment system of FIG. 1.

In FIG. 2, air denoted by arrows 100 is introduced into the lower portion of the bed 23 by the diffuser 29 and waste water denoted by arrows 101 is introduced into the bed from above the filter bed 23 and passes through the particulate material in a counter-current direction with respect to the air flow through the bed 23.

The air is regulated in a manner such that particles of the filter 23 are slowly displaced from the lower portion of the bed, toward the upper portion of the bed and back towards the lower portion of the bed as represented by arrows. Circulation of the particulates affects the migrating solids from the surface 33 of the filter bed 23 to the lower portion of the bed, thus reducing head loss. This can result in a significantly lower surface concentration of solids and hence a low pressure drop or head loss across the surface 33.

As discussed, the particulate material, having small size and a low specific gravity, in a bed of shallow depth permits the bed to be slowly circulated under the appropriate control and action of the aeration system 27. Particulate material may rise with the air column and descend down the outside of the column. In other embodiments, the particulate material may travel up only one side of the treatment vessel, in an annular flow formation or in a more random fashion. Furthermore, circulation of the particulate material may be provided by means other than an aeration diffuser and again, as long as appropriate circulation of the particulate material is provided. Circulation may take several days. The circulation of the filter bed 23 can permit a high level of solids to be stored in the particulate material before backwashing is necessary.

The static bed 24 disposed below the circulating filter bed 23 is also made up of a particulate material such as sand. This bed delays the breakthrough of excess solids present in the treatment vessel 11 into the treated water stream. Furthermore, an increase in pressure drop across the static filter bed 24 may be used to automatically initiate a backwashing procedure. The static filter bed 24 also intercepts broken filter particles which may be broken off from the particulate material in the circulating bed 23.

Treated water passes from the plenum chamber 25 of the treatment vessel 11 over flow control weir 14. A disinfection device 34, for example an ultra-violet disinfection unit or an ozone generator may be provided in the discharge line 18, so as to kill any faecal bacteria which may present in the treated water stream. The over flow control weir 14 maintains constant filtration rates on the treatment vessel 11, and isolates the treatment vessel 11 from the water in the treated water storage tank 13.

From the disinfection device 42, treated water flows into the treated water storage tank 13, where it can be used on demand by a treated water reticulation system 50. It will be appreciated that the disinfection device 34 is optional depending upon the required use of the treated water. In the case where the treated water is used in a drip irrigation system and there is no risk of aerosols being generated, or no risk of human contact, the use of the disinfection device 34 is not necessary. However, if the treated water is used to irrigate by spray jets or other application such as toilet flushing, the use of the disinfection device 34 may be necessary to meet health and safety guidelines and protocols.

The reticulation system 50 includes a submerged pump 51 in the treated water tank 13. The use of a submerged pump reduces the amount of noise generated by the pump which, when used in an urban environment, has associated advantages. The pump 51 operation can be initiated manually or by pressure switch in the treated water reticulation system. The pump 51 may be switched off by a low level switch. Typically, a minimum volume is maintained in the treated water storage tank 13 to ensure at least one backwash may be performed as will be described in more detail below. A fine screen 52 may be fitted to the reticulation system.

Over a period of time and use, suspended solids build up in the treatment vessel 11, particularly on the static sand filter layer 24, as evidenced by increased head loss, and the treatment vessel must be backwashed so as to remove such solids. A backwash valve 35 which is normally in a closed position supplies water from the treated water tank 50 for use in the backwash process which provides a water flush to the lower portion of the treatment vessel 11 through a backwash line 36 connected to the discharge line 18. The backwash valve 35 may be controlled manually, by a timer mechanism or a programmable logic controller (PLC) for example. Additionally, a weighted backwash isolating valve 37 is provided between the backwash line 36 and the control weir 14 which, under normal flow conditions is open and which is closed by the pressure of backwash water to prevent short circuiting of backwash water over the control weir 14.

The back wash process may include an air scour by the air scour distribution system 30 simultaneously or prior to the water flush applied to the lower portion of the treatment vessel 11. Backwash water is collected by the self priming siphon 26 and discharged to sewer as depicted by arrow 24.

Backwash water rates are maintained to a rate below which the filter beds 23 and 24 of treatment vessel 11 fluidise. The violent scouring action entrains media particles in the backwash flow which are intercepted by a media screen 29 fitted above the filter bed 23.

Over a period of time, the filter bed 23 may physically break down under the action of aeration and backwashing. Particles of broken particulate filter material are flushed out of the system with the backwash water. Such loss of particulate filter material may require replenishment, as part of an annual maintenance routine, for example.

In operation of the system 10, the feed pump 21 is activated to introduce waste water into the treatment vessel 11. If not already in operation, the aeration air pump 28 which supplies air to an air diffuser 29, is activated typically by a float switch (not shown). The grey water percolates down through particulate material in the circulating filter bed 23 and the static filter bed 24 and is collected in plenum chamber 25.

When the waste water storage tank 12 is at a minimum level, a low level switch deactivates the treatment vessel feed pump 21 and the aeration air pump 28. The treatment vessel feed pump 21 and the aeration air pump 28 may also be deactivated by a high level switch in treated water tank 13.

Figure 3:
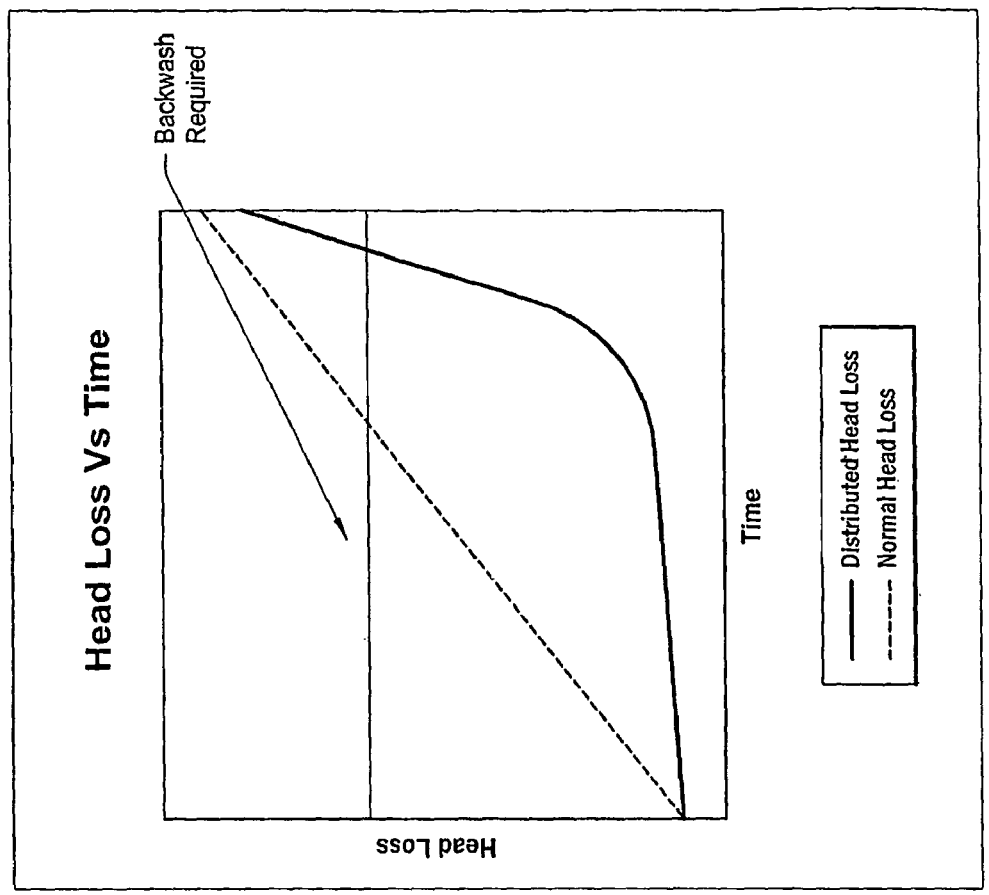
FIG. 3 is a graph illustrating head loss over time for a circulating bed and static bed of a waste water treatment system.

In some embodiments of the waste water treatment process, particularly when used in domestic applications, backwash volumes of around 1% of treated water volumes can be demonstrated and volumes of less than about 5% are anticipated overall. FIG. 3 illustrates the head loss over time of the circulating bed as compared to a normal static head. The head loss in the circulating bed is referenced is a "distributed head loss" and it is significantly lower than the normal head loss curve. Head loss for the distributed system does not increase until the end of the filter run time. Lower head condition allow for longer run time and increased filtration rates.

Embodiments of the waste water treatment process will be described with reference to the following examples:

EXAMPLE 1

Description

The GWM Grey Water Treatment Unit was a prototype model. Grey water flows were collected from baths, showers, hand basins and washing machines.

Influent Flow Rate 300-750 L/day

Influent Grey Water Characteristics

Characteristics of the grey water are defined by the household cleaning and personal care products used at the property. Products (e.g. phosphate free washing liquid) used and discharged into the prototype unit were specifically selected to ensure optimum operating and treatment conditions were obtained.

Treatment Rate 40-50 L/hr

Aeration Loading 0.3 m/hr-0.5 m/hr (NOTE: m/hr=$m^3/m^2$/hr. This is the volume ($m^3$) of air per treatment vessel area ($m^2$) per time period (hr))

Scouring Loading 30 m/hr-60 m/hr (NOTE: m/hr=$m^3/m^2$/hr)

Treatment Vessel Size and Media Depth

Treatment Vessel Diameter=200 mm

Treatment Vessel Height=2000 mm

Depth of GAC=0.7

Sand: 0.3

Media Types

GAC Effective size 0.7 to 1 mm

GAC Uniformity coefficient<1.6

Sand Effective size 1 mm

Sand uniformity coefficient<1.5

Treated Water Characteristics

Results from the seventeen (17) samples taken indicate significant reductions in all parameters investigated.

- Average BOD reduction occurred from 42.6 mg/L to 11.4 mg/L indicating that considerable physical and biological filtration is taking place in the treatment vessel.
- Denitrification is occurring with over 60% reduction from 4.4 mg/L to 1.6 mg/L
- Low phosphorus concentration were found in the influent grey water with over 99% of the effluent result returning undetectable concentration levels.
- Suspended solids results showed that over 75% of the effluent results contained undetectable concentrations.

Reductions in pathogenic material was observed with average influent concentrations of over 50,000 reduced to 115 (CFU/100 ml) where CFU=colony forming units.

material to spread across the length of the GAC bed increasing the runtime of the filter (NOTE: filter runtimes of the operating times between backwashing).

GWM Treated Grey Water Characteristics
SUMMARY OF RESULTS

|  | pH | | SS | | $BOD_5$ | | TN | | TKN | | TP | | Thermotolerant Coliforms | |
| --- | --- | --- | --- | --- | --- | --- | --- | --- | --- | --- | --- | --- | --- | --- |
|  | Influ | Efflu | Influ | Efflu | Influ | Efflu | Infl | Effl | Infl | Effl | Infl | Effl | Infl | Effl |
| Aver. | 7.6 | 7.1 | 27.5 | 7.8 | 42.6 | 11.4 | 4.4 | 1.6 | 3.6 | 0.9 | 0.1 | 0.4 | 5148.0 | 115.2 |
| Max | 9.4 | 7.4 | 54.0 | 14.0 | 72.0 | 20.0 | 11.0 | 4.0 | 11.0 | 2.9 | 0.2 | 0.4 | 20000.0 | 330.0 |
| Min | 6.9 | 6.9 | 15.0 | 5.0 | 14.0 | 5.0 | 1.8 | 0.3 | 1.7 | 0.5 | 0.1 | 0.4 | 100.0 | 1.0 |

EXAMPLE 2

Description

The Domestic Grey water Treatment System (DGTS) was developed to obtain accreditation from NSW Health Department. The DGTS was established at a boarding school accepting flows from the over 20 boarders from showers, hand basins and washing machines.

Influent Flow Rate
500-5000 L/day
Influent Grey Water Characteristics
Less control exists over the characteristics of the grey water due to boarders using an array of personal care products and washing machine detergents.
Treatment Rate
40-60 L/hr
Aeration Loading
0.3 m/hr-0.5 m/hr
Scouring Loading
30 m/hr-60 m/hr
Treatment Vessel Size and Media Depth
Treatment Vessel Diameter=250 mm
Treatment Vessel Height=2100 mm
Depth of GAC=0.95 m
Sand: 0.35 m
Media Types
GAC Effective size 0.7 to 1 mm
GAC Uniformity coefficient<1.6
Sand Effective size 1 mm
Sand uniformity coefficient<1.5
Treated Water Characteristics Limited data from the new treatment system is available however preliminary results show reductions in SS and BOD of over 90% and 95% respectively. Further pathogenic reduction were experienced from concentrations in excess of 5 million CFU/100 ml to undetectable limits.

Treatment Process Common to Both Systems

A number of processes occur in the treatment vessel to enhance the quality of the raw grey water.

1. Dual media filtration.

Physical filtration takes place in both the GAC and sand media layers. Unlike normal static filter beds the GAC media is slowly redistributed throughout its bed depth as a result of the particle movement from bubbles released from the air diffuser. This redistribution of the media allows the collected material to spread across the length of the GAC bed increasing the runtime of the filter (NOTE: filter runtimes of the operating times between backwashing).

Location of the air diffuser (between the two medias) ensure that only the GAC media is 'circulated' and that the sand media remains static ensuring the smaller fractions of the SS's are removed.

2. GAC Adsorption

GAC Adsorption is the binding of molecules or particles to the GAC surface. This is separate from absorption which is the filling of pores in a solid. The binding to the surface is usually weak and reversible. The GAC selected is extremely porous with a large surface area allowing extensive treatment of the influent grey water.

3. Biological Filtration (BF)

BF is a loose term describing the process of removing compounds from a water source using a bacterial and microorganism (biomass) population. It is not actually filtration rather the mixing of water with beneficial biomass that transform compounds from one state to another improving the quality of the water body. This biomass naturally forms on the surface area of the GAC. The biomass uses the organic pollutants (soaps, shampoos etc) in the grey water as a food source. In times of low flow or low concentrations of pollutants the biomass will feed on the adsorbed material to the carbon and naturally regenerate the column.

Parameters Vary Based on Grey Water Strength

Variation of the treatment vessel parameters allow differing strengths of grey water to be treated.

For example, low strength grey water would require less aeration and smaller depth of GAC. Increasing these parameters will allow the unit to treat much higher strength grey water.

Parameter Range

Parameters for differing grey water strengths using the GWM and DGTS system may range between the following values:

| | |
| --- | --- |
| Treatment Vessel Diameter: | 150-300 mm |
| Treatment Vessel Height: | 1500-3500 mm |
| Depth of GAC: | 0.7-2.5 |
| Sand Depth: | 0.3-0.75 |
| Aeration Loading: | 0.3 m/hr-0.5 m/hr |
| Scouring Loading: | 30 m/hr-60 m/hr |

The system 10 operates in a single stage operation with counter-flow arrangement and circulation of the filter bed.

This configuration can provide enhanced nitrification as the circulating filter bed can demonstrate a reduced tendency to clog and also the effluent may not by-pass, or short circuit, the filter bed. Further, significant alkalinity may be introduced in the waste water by detergents, and the use of soaps and detergents in showers. Such alkalinity may over time reduce the availability of plants of trace nutrients in soil when irrigated with such treated water, leading to stress and/or death of the plants. Nitrification of the water during treatment provides a means for correcting this alkalinity as hydrogen ions produced as part of the nitrification reaction. In the illustrated embodiment the system allows for longer periods between backwashing. This favours the development of slowly growing nitrifying bacteria in the biomass, can enhance the nitrifying potential of the column. In a further embodiment of the waste water treatment process when used with an appropriate detergent selection can produce substantially neutral water with respect to pH.

Further, the backwash water is discharged from the surface of the bed whereas the product water is discharged from the lower portion of the bed. As such, even in the case where backwash water is dirty upon leaving the surface of the bed, the production water may not be affected. The contaminants present in the backwash water can then be captured within the filtration media when the system is returned to service before reaching the production water. This can result in a system which requires substantially less water when backwashing and allows the system to be returned to service in a shorter period of time, thus increasing the overall efficiency of the system.

Although the waste water system 10 described with particular reference to grey water treatment in a domestic environment, it must be understood that the process may be applicable to other waste water treatment applications such as large scale commercial treatment of waste water. In the illustrated embodiment, the system 10 process is suitable to be fitted outside of a house under the eaves of the house. Alternatively, the system may be adapted to be positioned in other suitable locations in, or around or under the house. In other embodiments the height of the waste water treatment process may be higher than described above when in use for other applications. In further embodiments, multiple air diffusers may be placed in the treatment vessel at different heights.

Furthermore, embodiments of the waste water treatment process may be used in multi-dwelling residential complexes whereby the grey water from each residence is centrally processed at or adjacent the residential complex in one or more treatment systems.

It will be understood that the invention disclosed and defined in this specification extends to all alternative combinations of two or more of the individual features mentioned or evident from the text or drawings. All of these different combinations constitute various alternative aspects of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An aerated biological filtration system for treating waste water, the system comprising:

a treatment vessel through which waste water to be treated will pass, said treatment vessel having an upper inlet and a lower outlet;

a circulating filter bed located in said treatment vessel between the inlet and the outlet, said circulating filter bed being arranged to trap solids from the waste water within said bed and comprising of a particulate filter material having a specific gravity of greater than 1, individual particles having a surface or pore structure selected or adapted to facilitate the attachment of microorganisms on said particles; and aeration means adapted to diffuse air countercurrently through said filter bed either continuously or intermittently whilst waste water is being treated in said filter bed;

wherein the structure and the operating characteristics of the treatment vessel, the circulating filter bed and the aeration means are selected such that the particles are able to move relative to each other within the circulating filter bed; and operation of the filtration system will cause a substantial portion of the particulate material to circulate within the circulating filter bed over time to promote distribution of the trapped solids within said bed.

2. An aerated biological filtration system according to claim 1, wherein the particulate material used in the circulating filter bed is selected from the group comprising a granular carbon material, an expanded heat treated clay material, a granulated blast furnace slag.

3. An aerated biological filtration system according to claim 1, wherein the treatment vessel is of a generally elongate configuration, and is mounted with its axis generally vertical.

4. An aerated biological filtration system according to claim 3, wherein the vessel has a height to average diameter ratio of between 4:1 and 8:1.

5. An aerated biological filtration system according to claim 4, wherein the vessel has a height to average diameter ratio of about 6:1.

6. An aerated biological filtration system according to claim 1, wherein the treatment vessel includes a head zone positioned above the filter bed to provide a head of influent above the filter bed.

7. An aerated biological filtration system according to claim 6, wherein the head zone is separated from the filter bed by a media capturing means.

8. An aerated biological filtration system according to claim 1, further comprising a holding tank for containment and/or buffering of waste water prior to treatment, the holding tank being located upstream of the inlet of the treatment vessel.

9. An aerated biological filtration system according to claim 1, further comprising a storage vessel located downstream of the outlet of the treatment vessel to contain treated water therein.

10. An aerated biological filtration system according to claim 1, wherein the system is adapted for the treatment of grey water from a domestic dwelling.

11. An aerated biological filtration system according to claim 1, wherein the filtration system is sized so as to be positioned beneath the eaves of a residential dwelling.

12. An aerated biological filtration system according to claim 1, wherein the height of the filter bed is selected from the heights of: less than about 2.5 meters; less than about 2.0 meters; and less than about 1.5 meters.

13. An aerated biological filtration system according to claim 1, further comprising a static filter bed located downstream of said filter bed, said static filter bed comprising a particulate material having a specific gravity greater than one.

14. An aerated biological filtration system according to claim 13, wherein a diffuser is located below the interface between the circulating filter bed and the static filter bed, said diffuser providing air so as to effect scouring of the filter bed and the static filter bed so as to assist is cleaning of the filtration system during backwashing.

15. An aerated biological filtration system for treating waste water, the system comprising:
   a treatment vessel through which waste water to be treated will pass, said treatment vessel having an upper inlet and a lower outlet;
   a circulating filter bed having a specific gravity of greater than 1 located in said treatment vessel between the inlet and the outlet;
   a static filter bed located in said treatment vessel downstream of said circulating filter bed, the static filter bed comprising a particulate material having a specific gravity of greater than 1; both the circulating filter bed and the static bed being arranged to trap solids from the waste water in said beds and
   aeration means adapted to diffuse air countercurrently through the circulating filter bed either continuously or intermittently whilst waste water is being treated in said circulating filter bed.

16. An aerated biological filtration system according to claim 15, wherein the static filter bed is located below and supports said circulating filter bed.

17. An aerated biological filtration system according to claim 15, wherein the static filter bed is formed from a sand.

18. An aerated biological filtration system according to claim 15, wherein the aeration means is located at or about the interface between the filter bed and the static filter bed.

19. A method for treating waste water, the method comprising the steps of:
   providing an aerated biological filtration system, said aerated biological filter comprising a treatment vessel having an upper inlet and a lower outlet, a filter bed located in said treatment vessel arranged to trap solids from said waste water in said bed, said filter bed comprising a particulate filter material having a specific gravity of greater than 1, individual particles having a surface or pore structure selected or adapted to facilitate attachment of micro-organisms on said particles, and aeration means;
   passing waste water through said treatment vessel via said inlet and said outlet, the waste water passing through the treatment vessel from above the filter bed to below the filter bed;
   diffusing air from said aeration means countercurrently through said filter bed; and
   circulating the filter bed such that the particulate material particles move relative to each other in the filter bed, and such that a substantial portion of the particulate material circulates within the filter bed over time so as to promote distribution of said trapped solids in said filter bed.

20. A method according to claim 19, further comprising the step of controlling the manner in which the aeration means diffuses air through said filter bed so as to effect circulation of said filter bed.

21. A method according to claim 19, wherein the particulate filter material has bacteria and/or micro-organisms attached thereto, and wherein the method comprises the step of diffusing air through said filter bed so as to provide oxygen to the bacteria and/or micro-organisms attached to the surface of the particles and to cause the circulation of the particles in the filter bed.

* * * * *